(12) United States Patent
Furuhata (10) Patent No.: US 10,386,186 B2
(45) Date of Patent: Aug. 20, 2019

(54) PHYSICAL QUANTITY SENSOR, ELECTRONIC DEVICE, AND MOVING OBJECT

(71) Applicant: Seiko Epson Corporation, Tokyo (JP)

(72) Inventor: Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 229 days.

(21) Appl. No.: 15/262,361

(22) Filed: Sep. 12, 2016

(65) Prior Publication Data

US 2017/0074655 A1    Mar. 16, 2017

(30) Foreign Application Priority Data

Sep. 15, 2015  (JP) ................................. 2015-182058

(51) Int. Cl.
*G01C 19/574*   (2012.01)

(52) U.S. Cl.
CPC ................... *G01C 19/574* (2013.01)

(58) Field of Classification Search
CPC . G01C 19/5642; G01C 19/574; G01P 15/125; G01P 2015/0842; G01P 2015/0854; G01P 2015/0871; G01P 2015/0817; G01P 2015/082; G01P 2015/0828; G01P 2015/0831; G01P 2015/0834; G01P 2015/0837

See application file for complete search history.

(56) References Cited

U.S. PATENT DOCUMENTS

| | | | |
|---|---|---|---|
| 7,019,231 B2 | 3/2006 | Ishikawa et al. | |
| 2008/0276706 A1 | 11/2008 | Hartmann et al. | |
| 2013/0192370 A1* | 8/2013 | Yoda | G01P 15/02 |
| | | | 73/514.01 |
| 2013/0276536 A1 | 10/2013 | Kanemoto | |
| 2015/0013458 A1 | 1/2015 | Tanaka | |

FOREIGN PATENT DOCUMENTS

| | | |
|---|---|---|
| JP | 2003-101032 A | 4/2003 |
| JP | 2005-283393 A | 10/2005 |
| JP | 2008-514968 A | 5/2008 |
| JP | 2010-032345 A | 2/2010 |
| JP | 2011-089822 A | 5/2011 |
| JP | 2013-221919 A | 10/2013 |
| JP | 2015-017886 A | 1/2015 |
| WO | WO-2006-034706 A1 | 4/2006 |

* cited by examiner

*Primary Examiner* — David M. Gray
*Assistant Examiner* — Andrew V Do
(74) *Attorney, Agent, or Firm* — Harness, Dickey & Pierce, P.L.C.

(57) ABSTRACT

A physical quantity sensor includes a substrate, a detection flap plate which is disposed facing the substrate, a mass portion which supports the detection flap plate, a beam portion which connects the detection flap plate and the mass portion, and a first regulating portion which is positioned between the detection flap plate and the mass portion and regulates displacement of the detection flap plate in an in-plane direction. In addition, the first regulating portion is provided in a corner portion of the detection flap plate which is formed in a rectangular shape.

15 Claims, 9 Drawing Sheets

PHYSICAL QUANTITY SENSOR, ELECTRONIC DEVICE, AND MOVING OBJECT

BACKGROUND

1. Technical Field

The present invention relates to a physical quantity sensor, an electronic device, and a moving object.

2. Related Art

In the related art, a configuration described in JP-T-2008-514968 is known as a gyro sensor (angular velocity sensor). The gyro sensor described in JP-T-2008-514968 is configured to a frame shape mass portion (frame), a movable plate (vibration device) which is disposed inside the mass portion, a beam portion (suspension piece) which connects the movable plate and the frame, and an electrode which is disposed facing the movable plate, and to vibrate in a Z axis direction while the movable plate torsionally deforms the beam portion by Coriolis force when angular velocity is applied about an X axis in a state in which the mass portion is vibrated in a Y axis direction. Due to vibration of such a movable plate, since electrostatic capacitor which is formed between the movable plate and the electrode is changed, it is possible to detect angular velocity that is applied to the gyro sensor based on the change in electrostatic capacitor.

However, in the gyro sensor in JP-T-2008-514968, there is a concern that the movable plate is displaced in an in-plane direction and the beam portion is damaged (generation of cracks, rupture, and the like) due to excessive warping, and the movable plate is damaged due to the movable plate colliding with the mass portion in a case where acceleration is applied to the gyro sensor in the in-plane direction of the movable plate. That is, in the gyro sensor in JP-T-2008-514968, there is a problem in which mechanical strength is lowered.

SUMMARY

An advantage of some aspects of the invention is to provide a physical quantity sensor, an electronic device, and a moving object that are able to exhibit superior mechanical strength.

Such an advantage is achieved by the aspects of the invention below.

According to an aspect of the invention, there is provided a physical quantity sensor including a substrate, a movable plate which is disposed facing the substrate, a support portion which supports the movable plate, an elastically deformable beam portion which connects the movable plate and the support portion such that the movable plate is displaceable in a thickness direction of the substrate with respect to the substrate, and a first regulating portion which is positioned between the movable plate and the support portion and regulates displacement of the movable plate in the in-plane direction.

Thereby, since displacement of the movable plate is regulated by the first regulating portion, a physical quantity sensor is obtained which is able to prevent impact of the movable plate to the support portion or excessive change of shape of the beam portion and has superior mechanical strength.

In the physical quantity sensor according to the aspect of the invention, it is preferable to provide the first regulating portion on the movable plate.

Thereby, the disposition of the first regulating portion is easy. In addition, for example, it is possible to integrally form the first regulating portion with the movable plate.

In the physical quantity sensor according to the aspect of the invention, it is preferable that the movable plate is a rectangular shape in planar view, and to provide the first regulating portion in a corner portion of the movable plate.

Thereby, it is possible to effectively reduce contact between the movable plate and the support portion. In addition, since the corner section of the movable plate is at a location that tends to be chipped or damaged due to impact, it is possible to effectively protect the movable plate by protecting such a location using the first regulating portion.

In the physical quantity sensor according to the aspect of the invention, it is preferable that the movable plate is displaced in the thickness direction by being inclined about a rotary shaft and has a part in which width of a direction along the rotary shaft gradually decreases along a direction which is separated from the rotary shaft.

Thereby, it is difficult for the movable plate and the support portion to contact.

In the physical quantity sensor according to the aspect of the invention, it is preferable to provide the first regulating portion in the support portion.

Thereby, the disposition of the first regulating portion is easy. In addition, for example, it is possible to integrally form the first regulating portion with the support portion.

In the physical quantity sensor according to the aspect of the invention, it is preferable to provide the first regulating portion on the substrate.

Thereby, it is possible to dispose the first regulating portion without contacting the movable plate and the support portion. For this reason, the first regulating portion does not influence displacement of the movable plate or the support portion.

In the physical quantity sensor according to the aspect of the invention, it is preferable that the movable plate has a first movable plate and a second movable plate that are disposed parallel to each other, the beam portion has a first beam portion which connects the first movable plate and the support portion and a second beam portion which connects the second movable plate and the support portion, and a second regulating portion that is positioned between the first movable plate and the second movable plate and regulates displacement of the first movable plate and the second movable plate in the in-plane direction, is provided.

Thereby, it is possible to prevent contact between the first movable plate and the second movable plate.

In the physical quantity sensor according to the aspect of the invention, it is preferable to provide the second regulating portion on the substrate.

Thereby, the disposition of the second regulating portion is easy.

According to another aspect of the invention, there is provided an electronic device including the physical quantity sensor of the aspect of the invention.

Thereby, an electronic device is obtained which has superior mechanical strength and high reliability.

According to still another aspect of the invention, there is provided a moving object of the invention including the physical quantity sensor of the aspect of the invention.

Thereby, an electronic device is obtained which has superior mechanical strength and high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

A physical quantity sensor, an electronic device, and a moving object of the invention will be described below in detail based on the embodiments which are illustrated in the drawings.

First Embodiment

First, a physical quantity sensor according to the first embodiment of the invention will be described.

Figure 1:
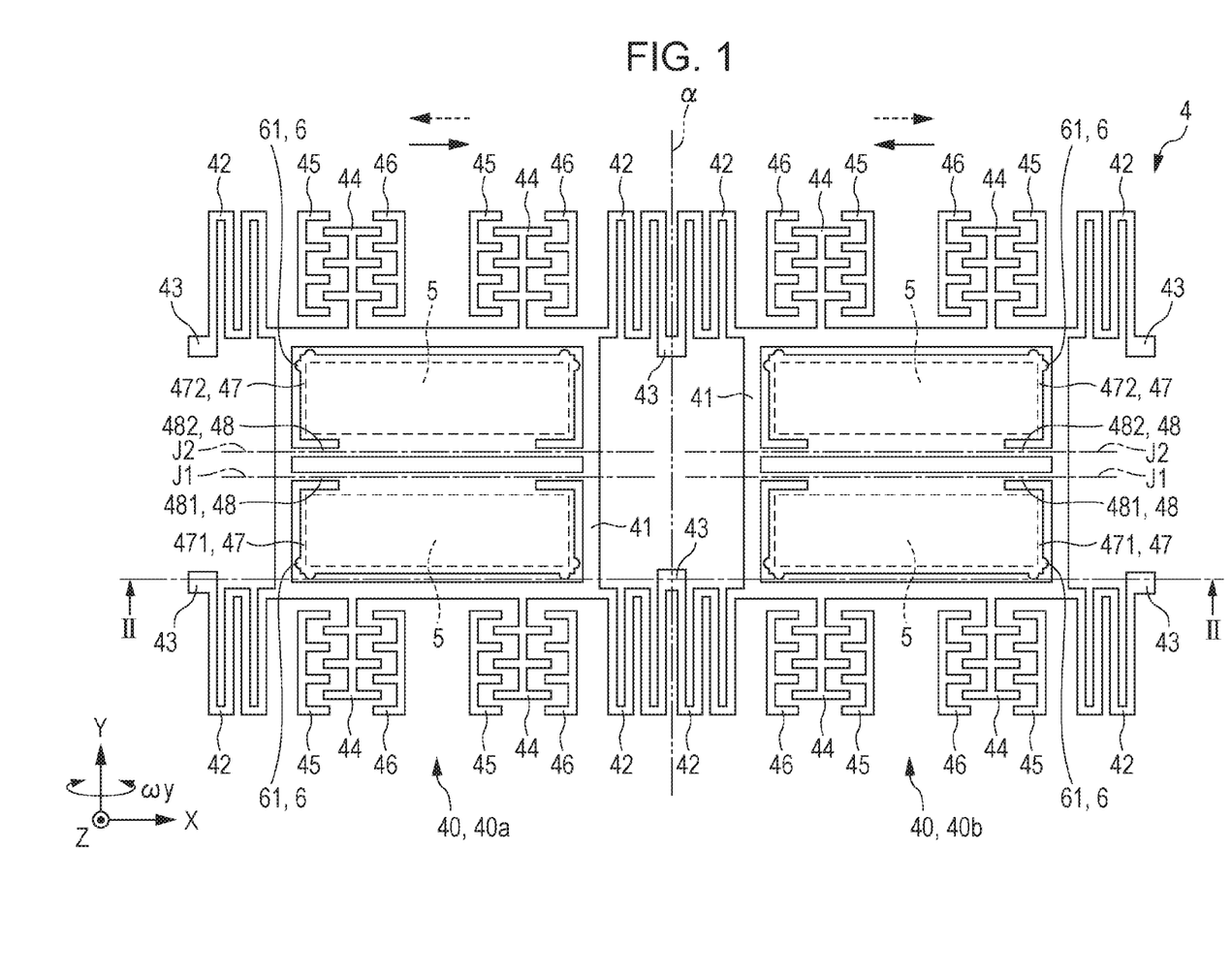
FIG. 1 is a planar view illustrating a physical quantity sensor according to a first embodiment of the invention.
Figure 2:
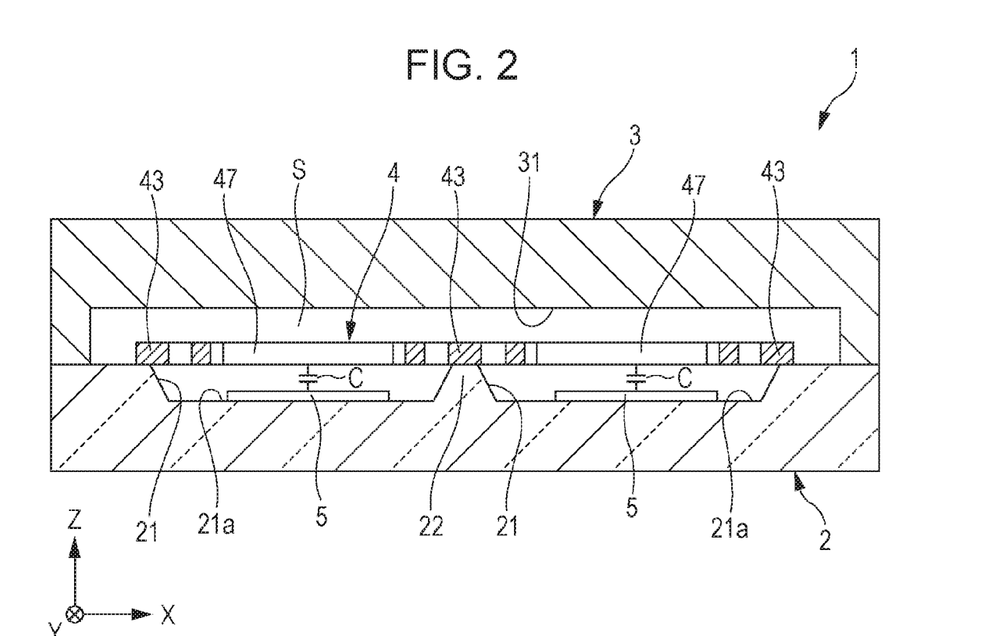
FIG. 2 is a sectional view along line II-II in FIG. 1.
Figure 3:
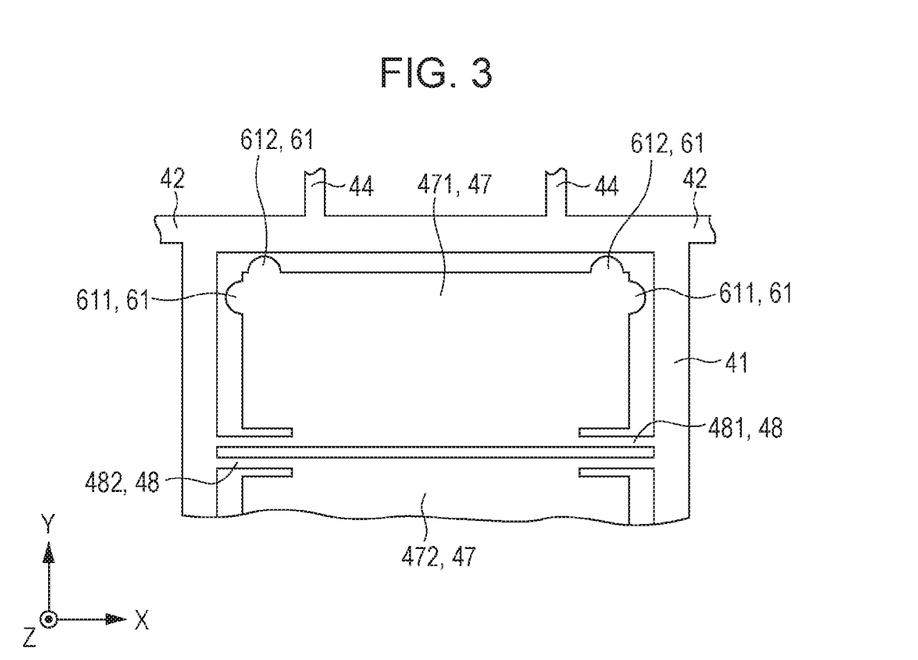
FIG. 3 is a planar view illustrating a regulating portion included in the physical quantity sensor illustrated in FIG. 1.
Figure 4:
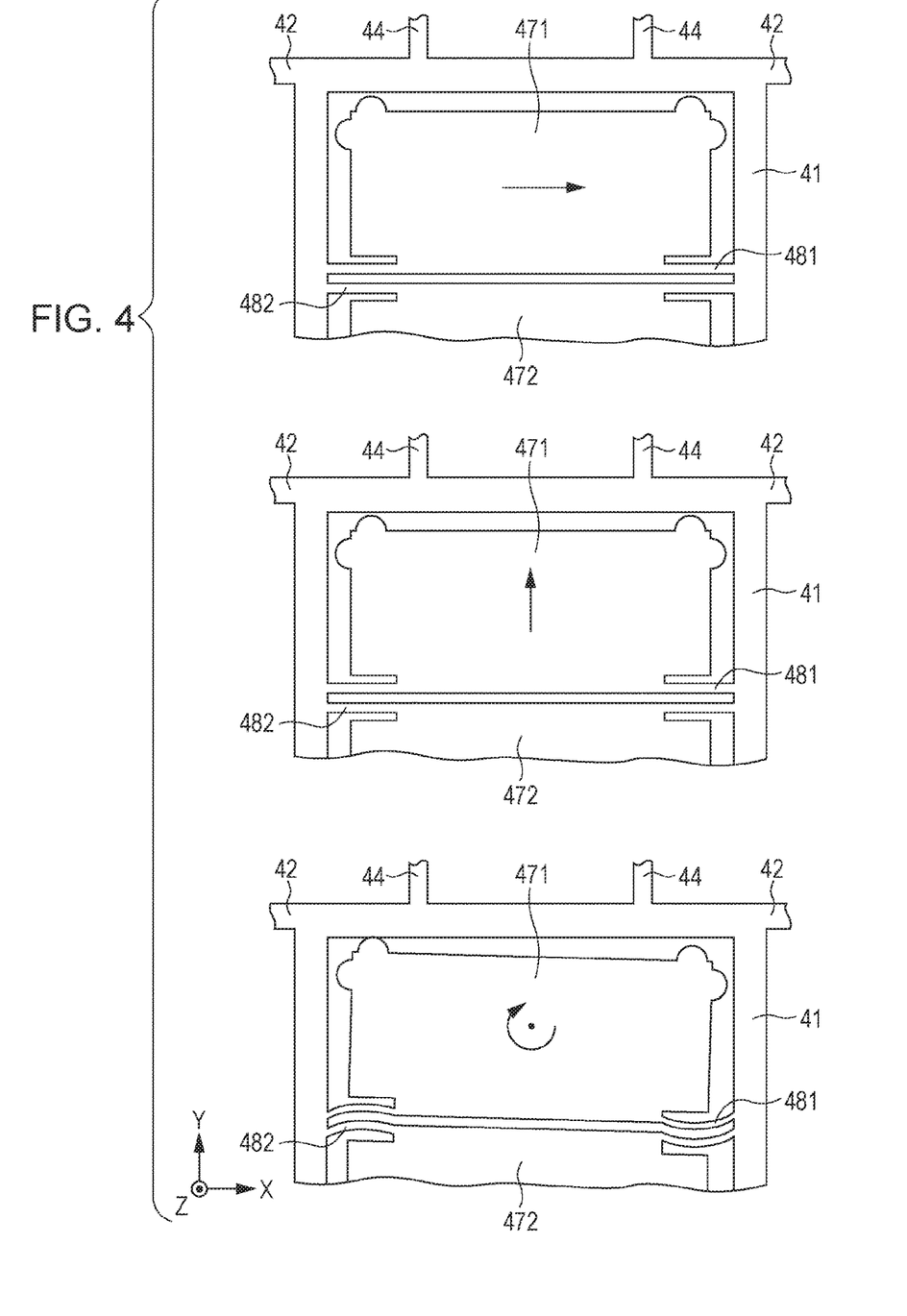
FIG. 4 is a planar view illustrating displacement of a detection flap plate in an in-plane direction.
Figure 5:
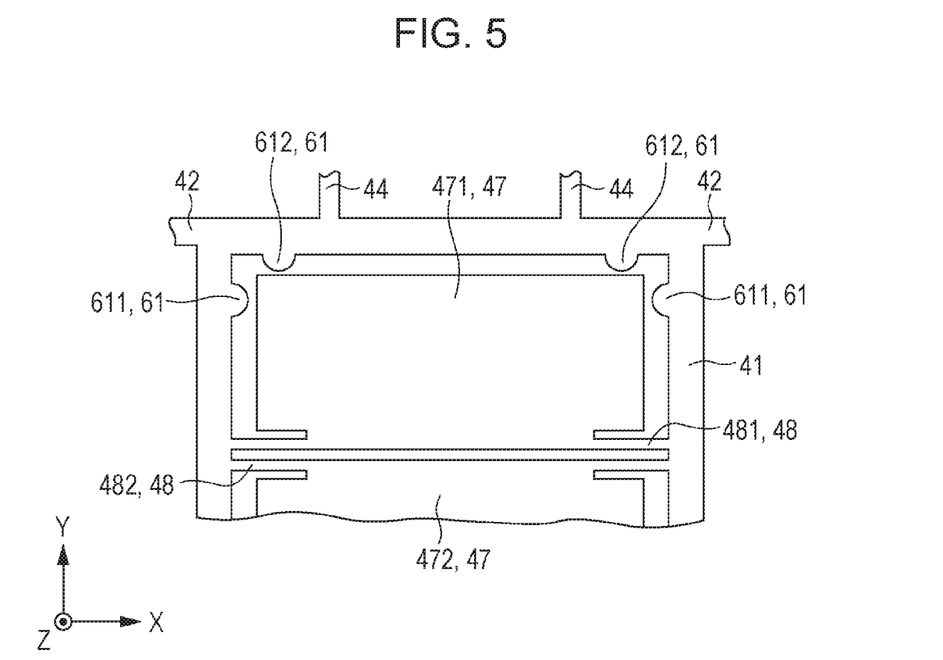
FIG. 5 is a planar view illustrating a modification example of the regulating portion which is illustrated in FIG. 3.
Figure 6:
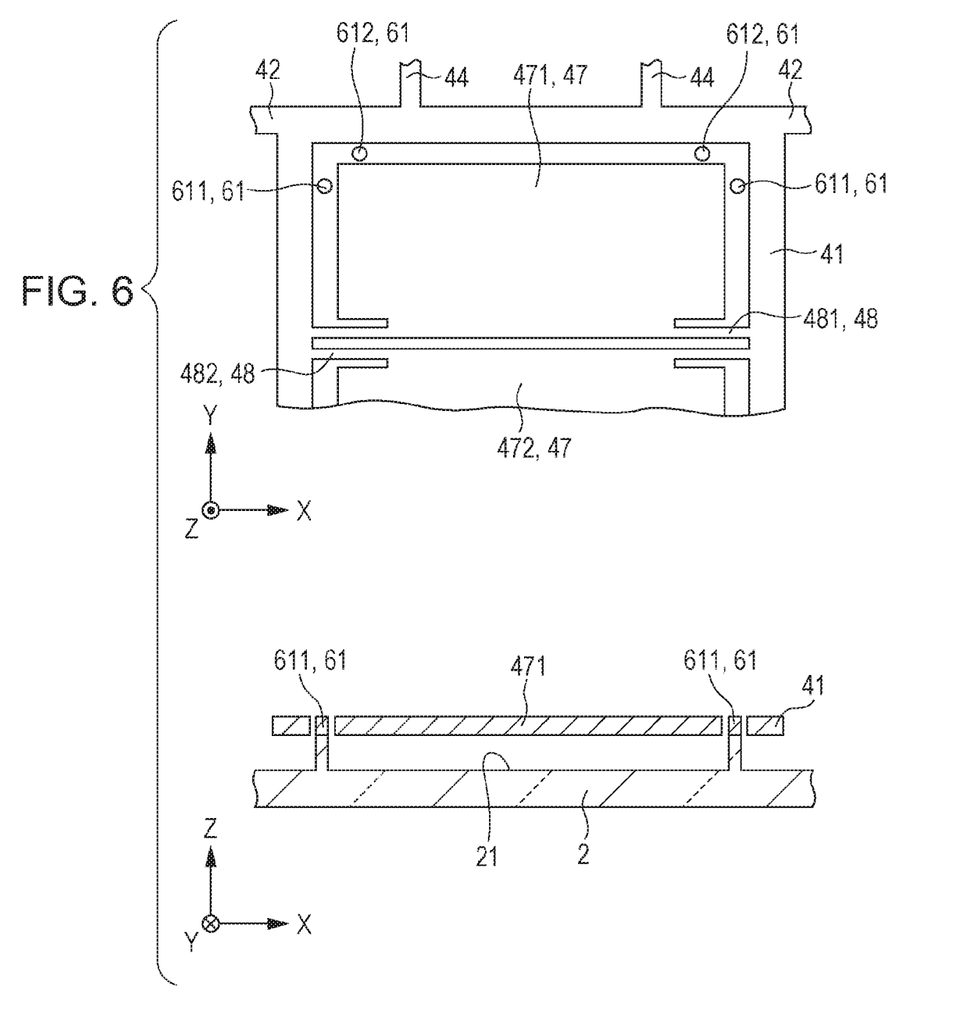
FIG. 6 is a planar view and a sectional view illustrating a modification example of the regulating portion which is illustrated in FIG. 3.

FIG. 1 is a planar view illustrating the physical quantity sensor according to the first embodiment of the invention. FIG. 2 is a sectional diagram taken along line II-II in FIG. 1. FIG. 3 is a planar view illustrating a regulating portion which has the physical quantity sensor illustrated in FIG. 1. FIG. 4 is a planar view illustrating displacement of a detection flap plate in an in-plane direction. FIG. 5 is a planar view illustrating a modification example of the regulating portion which is illustrated in FIG. 3. FIG. 6 is a planar view and a sectional view illustrating a modification example of the regulating portion which is illustrated in FIG. 3. Note that, in the description below, an X axis, a Y axis, and a Z axis are set as three axes which are orthogonal to each other. In addition, a direction along the X axis is referred to as an "X axis direction", a direction along the Y axis is referred to as a "Y axis direction", and a direction along the Z axis is referred to as a "Z axis direction".

A physical quantity sensor 1 shown in FIGS. 1 and 2 is a gyro sensor which is able to detect an angular velocity ωy about the Y axis. The physical quantity sensor 1 has a substrate 2, a lid 3, a functional element 4, and a regulating portion 6. Note that, for convenience of description, in FIG. 1, illustration of the substrate 2 and the lid 3 is omitted.

The substrate 2 has a concave portion 21 which opens to an upper surface and a post (projecting portion) 22 which is provided within the concave portion 21, and the functional element 4 is supported by the upper surface and the post 22. In addition, four fixed detection electrodes 5 which form an electrostatic capacitor C within the functional element 4 is provided on a bottom surface 21a of a concave portion 21. Meanwhile, the lid 3 has a concave portion 31 which is open on a lower surface. Then, the substrate 2 and the lid 3 are bonded so as to form an internal space S with the concave portion 21 and the concave portion 31, and the functional element 4 is accommodated in the internal space S. Note that, it is preferable for the internal space S to be in a reduced pressure state (preferably, approximately 10 Pa or less). Thereby, it is possible to reduce viscosity resistance and effectively vibrate (drive) the functional element 4.

In the embodiment, the substrate 2 is formed from a glass substrate and the lid 3 is formed from a silicon substrate. For this reason, it is possible to bond the substrate 2 and the lid 3 by anodic bonding. However, the substrate 2 and the lid 3 are not limited to such materials, and the bonding method of the substrate 2 and the lid 3 is not limited to such a method.

As described above, the functional element 4 is disposed in the internal space S, and the upper surface of the substrate 2 and the post 22 are bonded. Such a functional element 4 has two structures 40 (40a and 40b). The two structures 40a and 40b are provided lined up in the X axis direction, and are symmetrical along the Y axis with respect to a virtual straight line α.

The structure 40 has a mass portion (vibration portion) 41, a driving panel portion 42, a fixing portion 43, a movable driving electrode 44, fixed driving electrodes 45 and 46, a detection flap plate (movable plate) 47, and a beam portion 48. In addition, the detection flap plate 47 has a first flap plate (first movable plate) 471, and a second flap plate (second movable plate) 472, and the beam portion 48 has a first beam portion 481 and a second beam portion 482. Such a structure 40 is integrally formed by patterning by etching and the like (for example, dry etching) a silicon substrate with conductivity that is doped with impurities such as phosphorus and boron.

The mass portion 41 is a rectangular frame and is positioned on the center portion of the structure 40. Then, one end portion of the driving panel portion 42 is connected to each of four corners of the mass portion 41. Another end portion of the driving panel portion 42 is connected to the fixing portion 43, and the fixing portion 43 is bonded to the upper surface of the substrate 2 or the post 22. Thereby, there is a state in which the mass portion 41 and a driving panel portion 42 are supported in a state of floating away from the substrate 2. For this reason, it is possible to vibrate the mass portion 41 in the X axis direction with respect to the substrate 2 by expanding and contracting (elastically deforming) the driving panel portion 42 in the X axis direction. The joining method of the fixing portion 43 and the post 22 is not particularly limited, but, for example, it is possible to use anodic bonding.

The movable driving electrodes 44 are provided on the mass portion 41, and in the embodiment, a total of four movable driving electrodes 44 are provided in the mass portion 41, two at the +Y axis side and two at the −Y axis side. The movable driving electrodes 44 are tooth shaped provided with a stem portion which extends from the mass portion 41 in the Y axis direction and a plurality of branch portions which extend from the stem portion in the X axis direction. Meanwhile, the fixed driving electrodes 45 and 46 are bonded (fixed) to the substrate 2. The fixed driving electrodes 45 and 46 are provided facing the movable driving electrode 44, and the movable driving electrode 44 is positioned between the fixed driving electrodes 45 and 46. In addition, the fixed driving electrodes 45 and 46 are tooth shaped provided with the stem portion which extends in the Y axis direction and the branch portion which extends from the stem portion in the X axis direction.

For this reason, when the driving voltage is applied between the movable driving electrode 44 and the fixed driving electrodes 45 and 46, an electrostatic force is generated between the movable driving electrode 44 and the fixed driving electrodes 45 and 46, thereby, it is possible to expand and contract the driving panel portion 42 in the X axis direction and the mass portion 41 is vibrated (driven) in the X axis direction. Here, in the structure 40*a* and the structure 40*b*, the disposition of the fixed driving electrode 45 and the fixed driving electrode 46 are opposite (symmetrical). For this reason, the mass portion of the structure 40*a* and the mass portion 41 of the structure 40*b* are vibrated in a reverse phase in the X axis direction so as to come close to and be separated from each other. Thereby, it is possible to cancel the vibration of the structures 40*a* and 40*b*, and it is possible to reduce vibration leakage.

Note that, in the embodiment, as described above, an aspect (electrostatic drive system) which vibrates the mass portion 41 due to electrostatic force is described, but the system which vibrates the mass portion 41 is not particularly limited, and it is also possible to apply a piezoelectric drive system, an electromagnetic drive system which utilizes a Lorentz force of a magnetic field, and the like.

The first and second flap plates 471 and 472 are positioned inside the mass portion 41, and are disposed lined up in the Y axis direction. In addition, the first and second flap plates 471 and 472 are each rectangular plate shapes. In addition, the first flap plate 471 is connected to the mass portion 41 using the first beam portion 481 in the end portion on the +Y axis side, and the second flap plate 472 is connected to the mass portion 41 using the second beam portion 482 in the end portion on the −Y axis side. In such first and second flap plates 471 and 472, the first and second beam portions 481 and 482 are caused to torsionally deform (elastically deformed) and are rotated (displaced) about rotary shafts J1 and J2 that are formed by the first and second beam portions 481 and 482 due to Coriolis force by angular velocity ωy being applied about the Y axis in the physical quantity sensor 1 of a state in which the mass portion 41 is vibrated in the X axis direction.

The regulating portion 6 regulates excessive displacement of the detection flap plate 47 (first and second flap plates 471 and 472) in the in-plane direction, and mainly has a function of reducing damage to the functional element 4.

Such a regulating portion 6 has the first regulating portion 61 which is positioned between the first and second flap plates 471 and 472 and the mass portion 41. Note that, since the first regulating portion 61 which is positioned between the first flap plate 471 and the mass portion 41 and the first regulating portion 61 which is positioned between the second flap plate 472 and the mass portion 41 are configured in the same manner, for convenience of description, the first regulating portion 61 which is positioned between the first flap plate 471 and the mass portion 41 is described below as a representative.

As shown in FIG. 3, the first regulating portion 61 is positioned between the first flap plate 471 and the mass portion 41. Then, as shown in FIG. 4, the first regulating portion 61 is designed so as to be in contact with the mass portion 41 in a case where the first flap plate 471 is displaced in the X axis direction, in the Y axis direction, and about the Z axis due to force (acceleration or angular velocity) which is applied to the physical quantity sensor 1. By providing such a first regulating portion 61, it is possible to prevent excessive displacement of the first flap plate 471, and it is possible to reduce damage (generation of rupture, cracks, and the like) due to excessive displacement of the first beam portion 481 or damage due to contact with the second beam portion 482. In addition, since impact on the mass portion 41 of the first flap plate 471 is reduced, it is also possible to reduce damage to the first flap plate 471. For this reason, the physical quantity sensor 1 has high mechanical strength. In addition, it is possible to reduce electrical adsorption or suction of the first flap plate 471 and the mass portion 41 by providing the first regulating portion 61.

In other words, there is a configuration such that the first regulating portion 61 contacts the mass portion 41 prior to deformation of the first beam portion 481 becoming excessive, prior to the first beam portion 481 contacting the second beam portion 482, and prior to the first flap plate 471 contacting the mass portion 41.

A plurality of first regulating portions 61 are provided on the side surface of the first flap plate 471, and is provided projecting outside of the first flap plate 471. Thereby, disposition of the first regulating portion 61 is easy, and more reliably, it is possible to position the first regulating portion 61 between the first flap plate 471 and the mass portion 41. In addition, formation of the first regulating portion 61 is easy since the first regulating portion 61 is able to be integrally formed with the first flap plate 471. Note that, in the embodiment, the first regulating portion 61 is integrally formed with the first flap plate 471 (that is, formed from a silicon substrate), but the first regulating portion 61 may not be integrally formed with the first flap plate 471. In this case, for example, it is possible to obtain the first regulating portion 61 that is superior in cushioning by forming the first regulating portion 61 using a relatively soft resin material such as natural rubber or silicone rubber (a material with a larger Young's modulus than silicon).

In addition, the first regulating portion 61 is provided in the corner portion on a free end side (+Y axis side) of the first flap plate 471, and includes a protrusion piece 611 which protrudes from the corner portion in the X axis direction and a protrusion piece 612 which protrudes from the corner portion in the Y axis direction. For this reason, in a case where the first flap plate 471 is displaced in the X axis direction with respect to the mass portion 41, displacement up to the first flap plate 471 or more is regulated due to the protrusion piece 611 contacting the mass portion 41. In addition, in a case where the first flap plate 471 is displaced in the Y axis direction with respect to the mass portion 41, displacement up to the first flap plate 471 or more is regulated due to the protrusion piece 612 contacting the mass portion 41. In addition, in a case where the first flap plate 471 is displaced about the Z axis with respect to the mass portion 41, displacement up to the first flap plate 471 or more is regulated due to at least one of the protrusion pieces 611 and 612 contacting the mass portion 41. In this manner, whatever the displacement of the first flap plate 471 in the in-plane direction, it is possible to effectively regulate by setting the configuration of the first regulating portion 61 described above. However, displacement and the number of the first regulating portion 61 is not limited to the displacement and the number of the embodiment as long as it is possible to regulate displacement of the first flap plate 471 described above.

In addition, the leading end portion of the first regulating portion 61 is configured by a curved convex surface. Thereby, it is possible to effectively reduce damage of the first regulating portion 61 when colliding with the mass portion 41. However, the form of the first regulating portion 61 is not limited to the form of the embodiment as long as it is possible to regulate excessive displacement of the first flap plate 471 described above.

The regulating portion 6 (first regulating portion 61) was described above. In the embodiment, a configuration is described in which the first regulating portion 61 is provided on the side surface of the first and second flap plates 471 and 472, but the disposition of the first regulating portion 61 is not particularly limited as long as the first regulating portion 61 is positioned between the first and second flap plates 471 and 472 and the mass portion 41.

For example, as shown in FIG. 5, the first regulating portion 61 may be provided on an inner peripheral surface of the mass portion 41 and protruding toward the inside of the mass portion 41. Due to such a configuration, disposition of the first regulating portion 61 is easy, and more reliably, it is possible to position the first regulating portion 61 between the first flap plate 471 and the mass portion 41. In addition, formation of the first regulating portion 61 is easy since the first regulating portion 61 is able to be integrally formed with the mass portion 41. In the configuration in FIG. 5, the first regulating portion 61 is integrally formed with the mass portion 41, but the first regulating portion 61 may not be integrally formed with the mass portion 41. In this case, for example, it is possible to form the first regulating portion 61 using a relatively soft resin material such as natural rubber or silicone rubber and thereby, it is possible to obtain the first regulating portion 61 that is superior in cushioning.

In addition, as shown in FIG. 6, the first regulating portion 61 may be supported on the substrate 2 and provided without contacting the first flap plate 471 and the mass portion 41. In this manner, it is possible to smoothly displace the vibration portion 41 and the first flap plate 471 without the first regulating portion 61 influencing vibration of the vibration portion 41 or displacement of the first flap plate 471 by providing the first regulating portion 61 without contacting the first flap plate 471 and the mass portion 41. In addition, in the configuration of the embodiment or indicated in FIG. 5, in a case where a separation distance between the first flap plate 471 and the mass portion 41 is relatively large, in accompaniment, it is necessary to form the first regulating portion 61 to be large, but according to the configuration, even if the separation distance between the first flap plate 471 and the mass portion 41 is relatively large, the first regulating portion 61 is not increased in size. Note that, in this case, it is preferable that the first regulating portion 61 is connected to the first flap plate 471 with the same potential, or electrically floats (is insulated).

For example, such a first regulating portion 61 is able to be formed from a silicon substrate that forms the functional element 4. Simply described, first the functional element 4 bonds the non-patterned silicon substrate to the substrate 2, then is formed to pattern the silicon substrate, but it is possible to form the functional element 4 along with the first regulating portion 61 when patterning. According to such a method, since it is possible to form the first regulating portion 61 simultaneously to the functional element 4, there is no accompanying increase or the like of processes.

However, the first regulating portion 61 may be formed using a relatively soft resin material such as natural rubber or silicone rubber, and in this case, it is possible to obtain the first regulating portion 61 that is superior in cushioning.

The fixed detection electrodes 5 are formed in a region which faces the first and second flap plates 471 and 472 of the substrate 2 (region that overlaps in planar view viewed from the Z axis direction), and electrostatic capacitor C is respectively formed between the first flap plate 471 and the fixed detection electrodes 5 and between the second flap plate 472 and the fixed detection electrodes 5. As described above, when the first and second flap plates 471 and 472 are displaced (inclined) about the rotary shafts J1 and J2 by the angular velocity ωy, since the size of the electrostatic capacitor C is changed, it is possible to detect the angular velocity ωy based on the change of the electrostatic capacitor C. Note that, the configuration material of the fixed detection electrodes 5 is not particularly limited as long as the material has conductivity, and for example, it is possible to use aluminum, gold, platinum, or indium tin oxide (ITO).

The shape of the physical quantity sensor 1 is described above. Next, the operation of the physical quantity sensor 1 will be described. First, driving voltage is applied between the movable driving electrode 44 and the fixed driving electrodes 45 and 46, and the mass portion 41 of the structure 40a and the mass portion 41 of the structure 40b are vibrated at a reverse phase in the X axis direction at a predetermined frequency. In this state, when the angular velocity ωy is applied about the Y axis in the physical quantity sensor 1, Coriolis force operates, and the first and second flap plates 471 and 472 of the structure 40a and the first and second flap plates 471 and 472 of the structure 40b are displaced in the reverse phase (in the Z axis direction) about the rotary shafts J1 and J2. Due to the first and second flap plates 471 and 472 being displaced, a gap between the first and second flap plates 471 and 472 and the fixed detection electrodes 5 is changed, and accompanying this, electrostatic capacitor C is changed. For this reason, it is possible to obtain the angular velocity ωy by detecting the amount of change of the electrostatic capacitor C.

A physical quantity sensor according to the first embodiment of the invention was described above. In the embodiment, the detection flap plate 47 which has the structure 40 has two flap plates (that is, the first and second flap plates 471 and 472), but the number of flap plates is not particularly limited, and for example, may be one. In addition, the orientation of the first and second flap plates 471 and 472 is not particularly limited, and for example, the free ends may be disposed facing each other (that is, the free end of the first flap plate 471 faces the −Y axis side, and the free end of the second flap plate 472 faces the +Y axis side), and the free ends may be disposed facing each other in the same direction (that is, the +Y axis direction or the −Y axis direction).

Second Embodiment

Next, a physical quantity sensor according to a second embodiment of the invention will be described.

Figure 7:
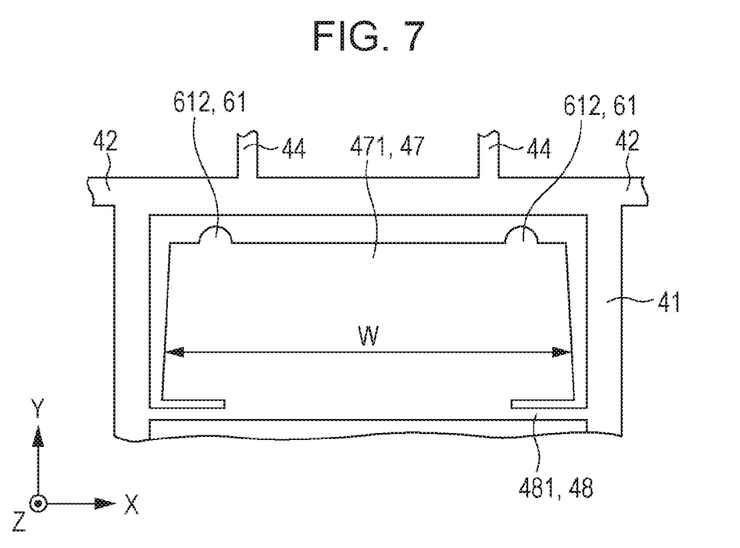
FIG. 7 is a planar view illustrating a physical quantity sensor according to a second embodiment of the invention.
Figure 8:
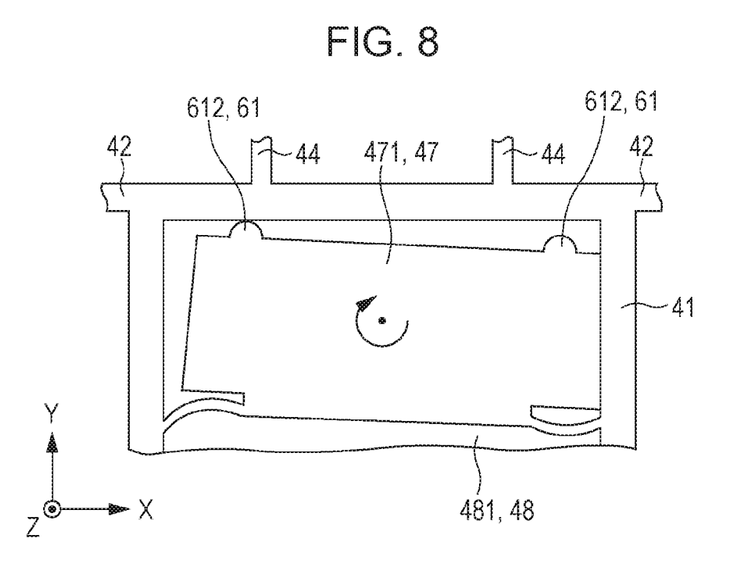
FIG. 8 is a planar view illustrating displacement of a detection flap plate in an in-plane direction.

FIG. 7 is a planar view illustrating the physical quantity sensor according to the second embodiment of the invention. FIG. 8 is a planar view illustrating displacement of a detection flap plate in an in-plane direction.

The physical quantity sensor according to the embodiment is the same as the physical quantity sensor according to the first embodiment described above aside from the shape of the detection flap plate and the configuration of the regulating portion which are different.

Note that, the description below relates to the physical quantity sensor of the second embodiment, the description focuses on the differences from the embodiments described above, and similar matter is omitted from the description. In addition, since the first and second flap plates are configured the same as each other, the first flap plate is described below as a representative. In addition, the configurations in FIGS. 7 and 8 which are the same as the embodiments described above are given the same reference numerals.

As shown in FIG. 7, the first flap plate 471 of the embodiment has a taper shape (trapezoidal shape) in which a width (width in the X axis direction) W gradually decreases toward the tip end side (in a direction which is separated from the rotary shaft J1). It is difficult for the first flap plate 471 to contact the mass portion 41 when the first flap plate 471 is displaced in the X axis direction or about the Z axis with respect to the mass portion 41 by setting the first flap plate 471 to such a shape. In addition, as shown in FIG. 8, even in a case where the first flap plate 471 is displaced about the Z axis and contacts the mass portion 41, it is possible for the side surface of the first flap plate 471 and the inner peripheral surface of the mass portion 41 to be caused to be in surface contact. For this reason, it is possible to soften an impact (stress concentration) during contact, and it is possible to reduce damage of the first flap plate 471 or the mass portion 41. Note that, in the embodiment, since it is difficult to contact the mass portion 41 in displacement of the first flap plate 471 in the X axis direction, the protrusion piece 611 is omitted form the first regulating portion 61. For this reason, it is simple in comparison to the first embodiment in which the configuration of the first regulating portion 61 is described above.

It is possible for the same effects to those in the first embodiment described above to also be exhibited in the second embodiment.

Third Embodiment

Next, a physical quantity sensor according to a third embodiment of the invention will be described.

Figure 9:
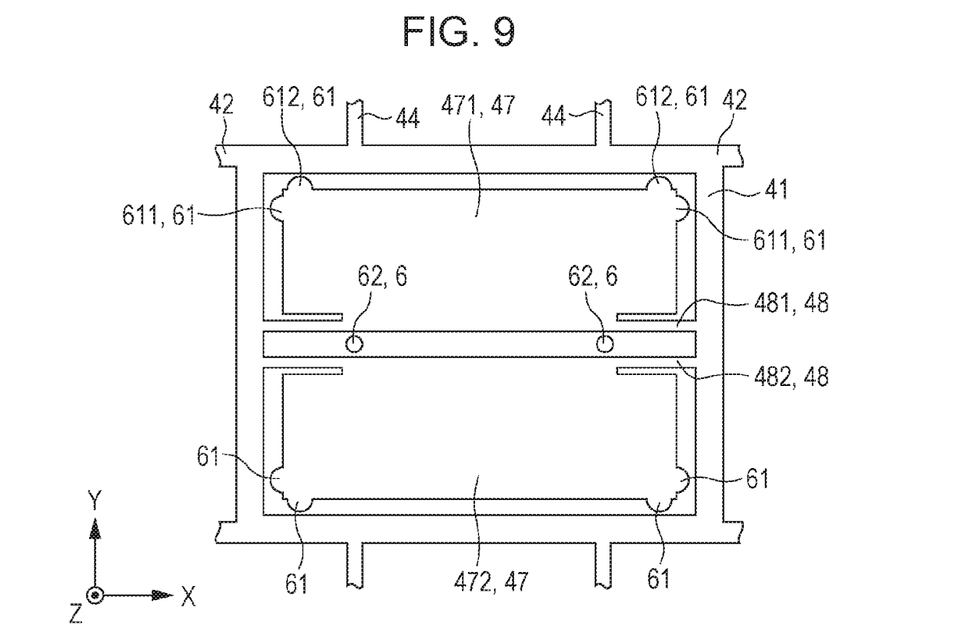
FIG. 9 is a planar view illustrating a physical quantity sensor according to a third embodiment of the invention.
Figure 10:
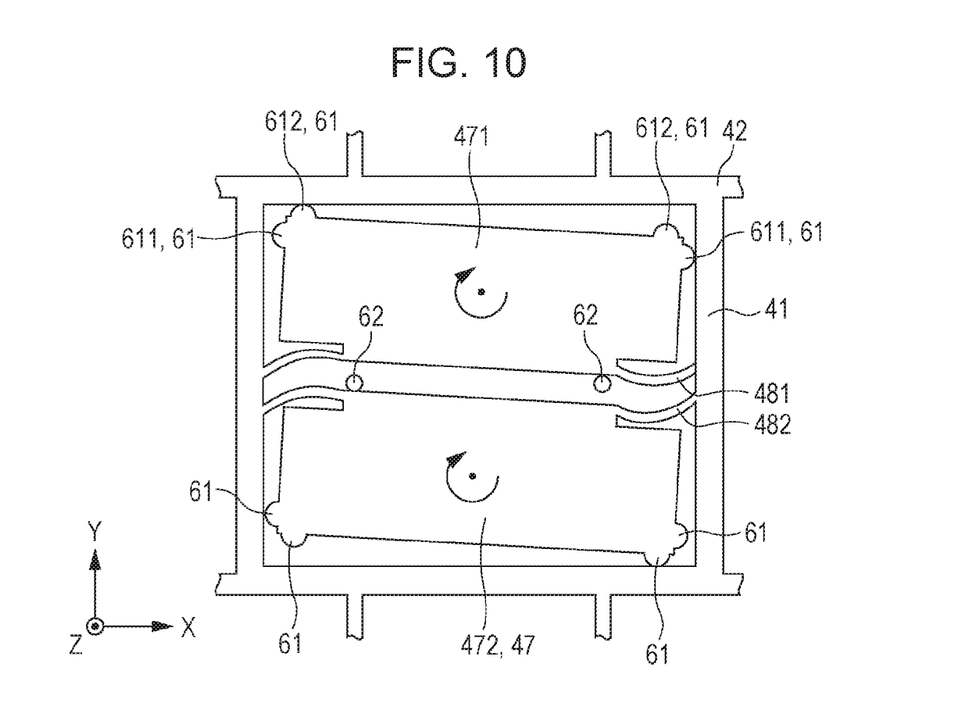
FIG. 10 is a planar view illustrating displacement of a detection flap plate in an in-plane direction.

FIG. 9 is a planar view illustrating a physical quantity sensor according to the third embodiment of the invention. FIG. 10 is a planar view illustrating displacement of a detection flap plate in an in-plane direction.

The physical quantity sensor according to the embodiment is the same as the physical quantity sensor according to the first embodiment described above aside from the configuration of the regulating portion which is different.

Note that, the description below relates to the physical quantity sensor of the third embodiment, the description focuses on the differences from the embodiments described above, and similar matter is omitted from the description. In addition, the configuration in FIG. 9 which is the same as the embodiments described above is given the same reference numerals.

The regulating portion 6 shown in FIG. 9 further has a second regulating portion 62 in addition to the first regulating portion 61. The second regulating portion 62 is positioned between the first flap plate 471 and the second flap plate 472, and excessive displacement is regulated in the in-plane direction of the first and second flap plates 471 and 472. In detail, as shown in FIG. 10, in a case where the first and second flap plates 471 and 472 are displaced in the Y axis direction or about the Z axis due to force (acceleration or angular velocity) which is applied to the physical quantity sensor 1, the second regulating portion 62 is designed so as to contact the first and second flap plates 471 and 472 prior to the first flap plate 471 and the second flap plate 472 contacting. For this reason, it is possible to prevent excessive displacement of the first and second flap plates 471 and 472, and it is possible to reduce damage (generation of rupture, cracks, and the like) due to excessive displacement of the first and second beam portions 481 and 482 or damage due to contact of the first and second beam portions 481 and 482 with each other. In this manner, the physical quantity sensor 1 has high mechanical strength due to having the second regulating portion 62.

In addition, the second regulating portion 62 is supported on the substrate 2 and is provided protruding from the upper surface of the substrate 2. In addition, the second regulating portion 62 is provided without contacting the first and second flap plates 471 and 472. In this manner, it is possible to smoothly displace the first and second flap plates 471 and 472 without the second regulating portion 62 influencing displacement of the first and second flap plates 471 and 472 by providing the second regulating portion 62 without contacting the first and second flap plates 471 and 472.

In addition, it is preferable that the second regulating portion 62 is electrically connected to the first and second flap plates 471 and 472 with the same potential, or electrically floats (is insulated).

For example, such a second regulating portion 62 is able to be formed from a silicon substrate that forms the functional element 4. However, for example, it is also possible to form the second regulating portion 62 using a relatively soft resin material such as natural rubber or silicone rubber, and thereby, it is possible to obtain the second regulating portion 62 that is superior in cushioning.

It is possible for the same effects to those in the first embodiment described above to also be exhibited in the third embodiment.

Next, an electronic device which is provided with the physical quantity sensor of the invention will be described.

Figure 11:
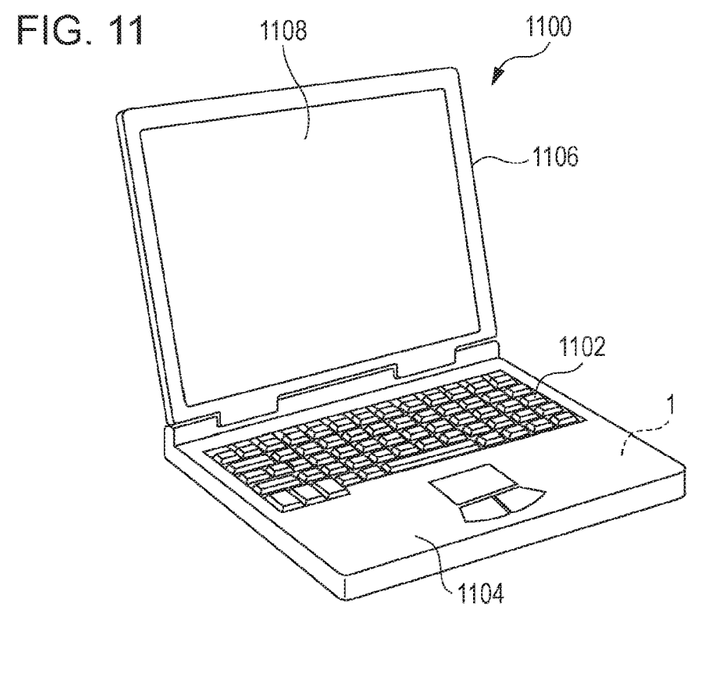
FIG. 11 is a perspective view illustrating a configuration of a mobile-type (or a notebook-type) personal computer to which an electronic device of the aspect of the invention is applied.

FIG. 11 is a perspective diagram illustrating a configuration of a mobile-type (or a notebook-type) personal computer to which the electronic device of the invention is applied.

In the drawing, a personal computer 1100 is configured by a main body section 1104 which is provided with a keyboard 1102, and a display unit 1106 which is provided with a display section 1108, and the display unit 1106 is supported so as to be able to rotate via a hinge structure section with respect to the main body section 1104. The physical quantity sensor 1 is built into the personal computer 1100.

Figure 12:
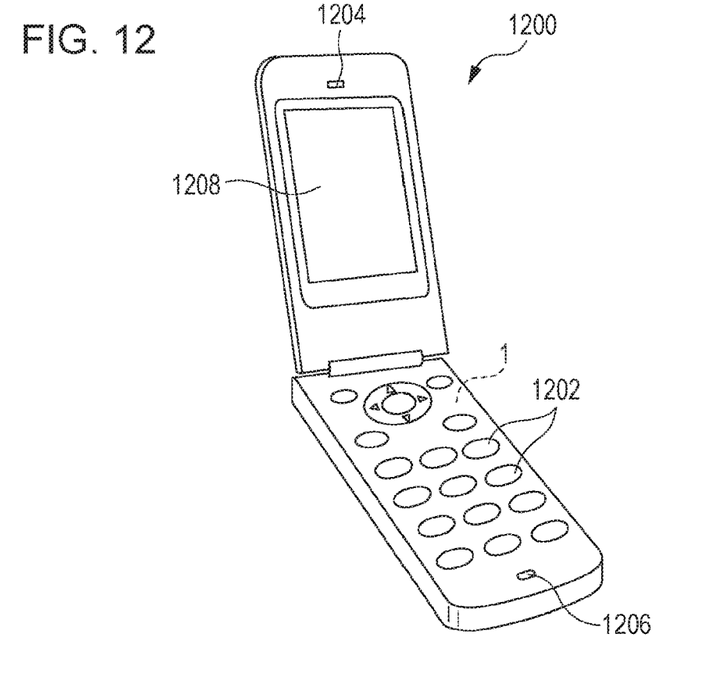
FIG. 12 is a perspective view illustrating a configuration of a mobile phone (also including PHS) to which the electronic device of the aspect of the invention is applied.

FIG. 12 is a perspective view illustrating a configuration of a mobile phone (also including PHS) to which the electronic device of the invention is applied.

In this drawing, a mobile phone 1200 includes an antenna (which is not shown in the drawings), a plurality of operation buttons 1202, a receiving port 1204, and a transmission port 1206, and a display section 1208 is arranged between the operation buttons 1202 and the receiving port 1204. The physical quantity sensor 1 is built into the mobile phone 1200.

Figure 13:
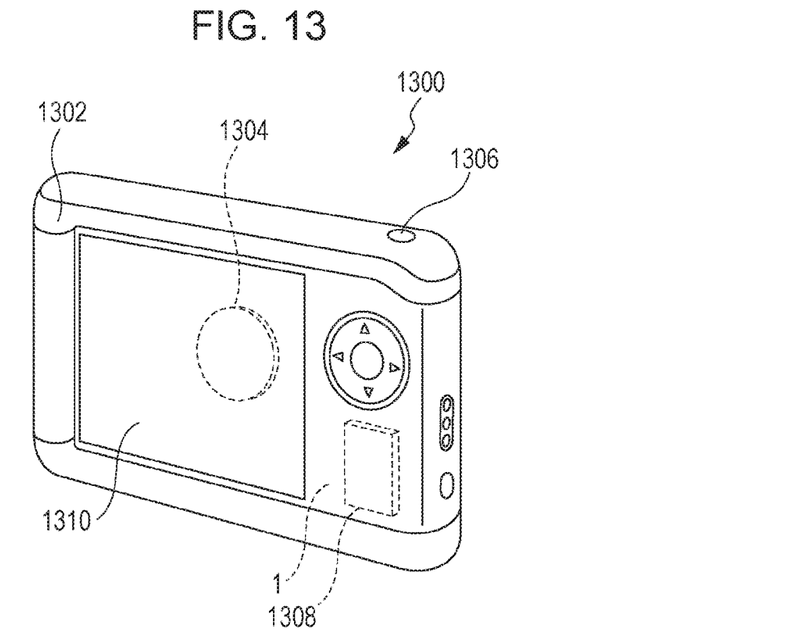
FIG. 13 is a perspective view illustrating a configuration of a digital still camera to which the electronic device of the aspect of the invention is applied.

FIG. 13 is a perspective view illustrating a configuration of a digital still camera to which the electronic device of the invention is applied.

The display section 1310 is provided on the rear surface of a case (body) 1302 in the digital still camera 1300, and is configured to perform display based on the imaging signal using the CCD, and the display section 1310 functions as a viewfinder which displays the subject as an electronic image. In addition, a light-receiving unit 1304 which includes an optical lens (imaging optical system), CCD, and the like is included at the front surface side (the rear surface side in the drawing) of the case 1302. Then, a subject image which is displayed on the display section 1310 is confirmed by a photographer, and at the point in time when a shutter button 1306 is pressed, the imaging signal of the CCD is transferred and stored in a memory 1308. The physical quantity sensor 1 which is used, for example, in image stabilization is built into the digital still camera 1300.

Such an electronic device includes the physical quantity sensor 1, and therefore has superior reliability.

Note that, in addition to the personal computer in FIG. 11, the mobile phone in FIG. 12, and the digital still camera in FIG. 13, it is also possible to apply the electronic device of the invention to, for example, a smartphone, a tablet terminal, a timepiece (including a smart watch), an ink jet-type discharging apparatus (for example, an ink jet printer), a laptop-type personal computer, a television, a video camera, a video tape recorder, a car navigation device, a pager, an electronic organizer (including those having a communication function), an electronic dictionary, an electronic calculator, an electronic game device, a word processor, a work station, a video phone, a television monitor for crime prevention, a pair of electronic binoculars, a POS terminal, medical equipment (for example, an electronic thermometer, a blood pressure meter, a blood glucose meter, an electrocardiographic measuring device, an ultrasonic diagnostic device, or an electronic endoscope), a fish finder, various measurement equipment, an instrument (for example, an instrument for a vehicle, an aircraft, or a ship), a flight simulator, and the like.

Next, a moving object of the invention will be described.

Figure 14:
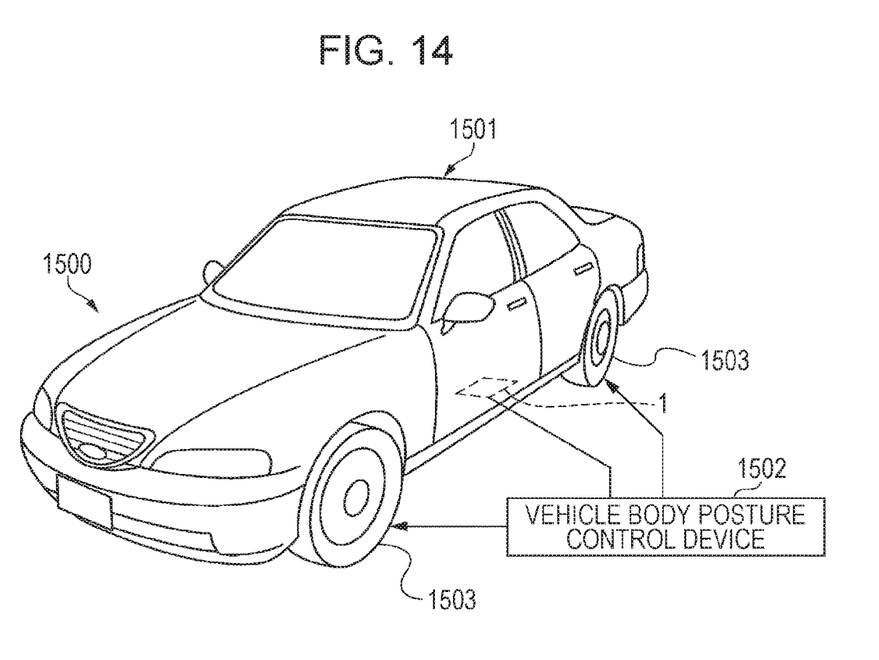
FIG. 14 is a perspective view illustrating an automobile to which a moving object of the aspect of the invention is applied.

FIG. 14 is a perspective view illustrating an automobile to which the moving object of the invention is applied.

As shown in FIG. 14, the physical quantity sensor 1 is built into an automobile 1500, and for example, it is possible to detect the posture of a vehicle 1501 using the physical quantity sensor 1. The detection signal of the physical quantity sensor 1 is supplied to a vehicle body posture control device 1502, the vehicle body posture control device 1502 detects the posture of the vehicle 1501 based on the detection signal, and according to the detection result, it is possible to control the hardness of suspension, or control brakes of individual wheels 1503. In addition, such posture control is able to be utilized in a biped walking robot or a radio controlled helicopter (including a drone). As above, posture control is realized in various mobile bodies, and the physical quantity sensor 1 is incorporated.

The physical quantity sensor, the electronic device, and the moving object of the invention are described above based on the embodiments of the drawings, but the invention is not limited thereto, and it is possible for the configuration of each portion to be substituted with an arbitrary configuration which has the same function. In addition, other arbitrary constructions may be added to the invention.

In addition, in the embodiment described above, a configuration is described in which the detection flap plate is rotated about the rotary shaft, but as long as it is possible to displace in the Z axis direction, the detection flap plate may displaced in any manner. For example, the detection flap plate may see-saw rock about the rotary shaft, and may be displaced in the Z axis direction maintained in a posture without change. That is, the physical quantity sensor may be a see-saw rock type, and the physical quantity sensor may be a parallel plate type.

In addition, the physical quantity sensor is not limited to a gyro sensor which detects angular velocity, and for example, may be a physical quantity sensor which detects a physical quantity other than angular velocity of an acceleration sensor, an atmospheric pressure sensor, or the like.

The entire disclosure of Japanese Patent Application No. 2015-182058, filed Sep. 15, 2015 is expressly incorporated by reference herein.

What is claimed is:

1. A physical quantity sensor comprising:
   a substrate;
   a movable plate which is disposed facing the substrate;
   a support frame which is continuously formed with the movable plate so as to support the movable plate, the support frame completely surrounding the movable plate in a plan view;
   an elastically deformable beam which is continuously formed with the movable plate and the support frame so as to connect the movable plate and the support frame such that the movable plate is displaceable in a thickness direction of the substrate with respect to the substrate; and
   a first regulating member which is continuously formed with the movable plate so as to be configured to regulate displacement of the movable plate in an in-plane direction,
   wherein the movable plate, the support frame, the elastically deformable beam, and the first regulating member are a monolithic body,
   the first regulating member outwardly projects from a peripheral edge of the movable plate,
   wherein the movable plate is quadrangular-shaped in the plan view, and
   the first regulating member is provided on a corner of the movable plate.

2. The physical quantity sensor according to claim 1,
   wherein the movable plate is displaceable in the thickness direction with respect to a rotation axis along the elastically deformable beam, and
   a width along the rotation axis of the movable plate tapers from a first part directly adjacent to the elastically deformable beam toward an outer edge of the movable plate.

3. The physical quantity sensor according to claim 1,
   wherein the movable plate is configured with a first movable plate and a second movable plate that are disposed directly adjacent to each other via the elastically deformable beam,
   the elastically deformable beam is configured with a first beam and a second beam, the first movable plate is connected to the support frame via only the first beam, and the second movable plate is connected to the support frame via only the second beam, and
   a second regulating member is positioned between the first movable plate and the second movable plate in the plan view, and the second regulating member is configured to regulate displacement of the first movable plate and the second movable plate in the in-plane direction.

4. The physical quantity sensor according to claim 3,
   wherein the second regulating member is provided on the substrate.

5. An electronic device comprising:
   the physical quantity sensor according to claim 1;
   a display that is configured to display an image; and
   a housing that houses the physical quantity sensor and the display.

6. A movable object comprising:
   the physical quantity sensor according to claim 1; and
   a movable body that houses the physical quantity sensor.

7. The physical quantity sensor according to claim 1,
wherein the movable plate is displaceable in the thickness direction with respect to a rotation axis along the elastically deformable beam, and the elastically deformable beam extends along the rotation axis, and
the elastically deformable beam has a slit therein, and the slit extends along the rotation axis.

8. The physical quantity sensor according to claim 7,
wherein the movable plate has a cutout, and the cutout is directly adjacent to a connection part connecting the elastically deformable beam and the support frame, and
the cutout extends along the slit so that the cutout and the slit are parallel to each other.

9. A physical quantity sensor comprising:
a substrate;
a movable plate which is disposed facing the substrate;
a support frame which is continuously formed with the movable plate so as to support the movable plate, the support frame completely surrounding the movable plate in a plan view;
an elastically deformable beam which is continuously formed with the movable plate and the support frame so as to connect the movable plate and the support frame such that the movable plate is displaceable in a thickness direction of the substrate with respect to the substrate; and
a first regulating member which is continuously formed with the movable plate so as to be configured to regulate displacement of the movable plate in an in-plane direction,
wherein the movable plate, the support frame, the elastically deformable beam, and the first regulating member are a monolithic body,
the first regulating member outwardly projects from a peripheral edge of the movable plate,
wherein the movable plate is displaceable in the thickness direction with respect to a rotation axis along the elastically deformable beam, and
a width along the rotation axis of the movable plate tapers from a first part directly adjacent to the elastically deformable beam toward an outer edge of the movable plate.

10. The physical quantity sensor according to claim 9,
wherein the movable plate is displaceable in the thickness direction with respect to a rotation axis along the elastically deformable beam, and the elastically deformable beam extends along the rotation axis, and
the elastically deformable beam has a slit therein, and the slit extends along the rotation axis.

11. The physical quantity sensor according to claim 10,
wherein the movable plate has a cutout, and the cutout is directly adjacent to a connection part connecting the elastically deformable beam and the support frame, and
the cutout extends along the slit so that the cutout and the slit are parallel to each other.

12. A physical quantity sensor comprising:
a substrate;
a movable plate which is disposed facing the substrate;
a support frame which is continuously formed with the movable plate so as to support the movable plate, the support frame completely surrounding the movable plate in a plan view;
an elastically deformable beam which is continuously formed with the movable plate and the support frame so as to connect the movable plate and the support frame such that the movable plate is displaceable in a thickness direction of the substrate with respect to the substrate; and
a first regulating member which is continuously formed with the movable plate so as to be configured to regulate displacement of the movable plate in an in-plane direction,
wherein the movable plate, the support frame, the elastically deformable beam, and the first regulating member are a monolithic body,
the first regulating member outwardly projects from a peripheral edge of the movable plate,
wherein the movable plate is configured with a first movable plate and a second movable plate that are disposed directly adjacent to each other via the elastically deformable beam,
the elastically deformable beam is configured with a first beam and a second beam, the first movable plate is connected to the support frame via only the first beam, and the second movable plate is connected to the support frame via only the second beam, and
a second regulating member is positioned between the first movable plate and the second movable plate in the plan view, and the second regulating member is configured to regulate displacement of the first movable plate and the second movable plate in the in-plane direction.

13. The physical quantity sensor according to claim 12,
wherein the second regulating member is provided on the substrate.

14. The physical quantity sensor according to claim 12,
wherein the movable plate is displaceable in the thickness direction with respect to a rotation axis along the elastically deformable beam, and the elastically deformable beam extends along the rotation axis, and
the elastically deformable beam has a slit therein, and the slit extends along the rotation axis.

15. The physical quantity sensor according to claim 14,
wherein the movable plate has a cutout, and the cutout is directly adjacent to a connection part connecting the elastically deformable beam and the support frame, and
the cutout extends along the slit so that the cutout and the slit are parallel to each other.

* * * * *